United States Patent [19]

Thompson

[11] 3,780,358

[45] Dec. 18, 1973

[54] GALLIUM ARSENIDE LASERS

[75] Inventor: George H. B. Thompson, Harlow, England

[73] Assignee: International Standard Electric Corporation, New York, N.Y.

[22] Filed: Sept. 29, 1971

[21] Appl. No.: 184,840

[52] U.S. Cl.......... 317/235 R, 317/235 N, 331/94.5, 317/235 AC, 317/234 Q

[51] Int. Cl............................................... H01b 33/00

[58] Field of Search.................... 331/94.5; 317/235, 317/235 N

[56] References Cited

UNITED STATES PATENTS

| | | | |
|---|---|---|---|
| 3,495,140 | 2/1970 | Cornely et al. | 331/94.5 X |
| 3,479,613 | 11/1969 | Rupprecht et al. | 331/94.5 |
| 3,163,562 | 12/1964 | Ross | 148/33.4 |

OTHER PUBLICATIONS

Kressel et al: "Control of Optical Losses in p–n Junction Lasers by Use of a Heterojunction," Jour. of App. Phys., Vol. 41, pp. 2019–2031, April, 1970

Parish et al: "Double–Heterostructure Injection Lasers with Room Temp. Thresholds as low as 2300A/cm$^2$." App. Phys. Lett., Vol. 16, pp. 326–327, April, 1970

Rupprecht et al: "Stimulated Emission from $Ga_{1-x}Al_x$ As Diodes at 77°K," IEEE Jour. of Quant. Elect., Vol. QE4, pp. 35, Jan. 1968

*Primary Examiner*—Martin H. Edlow

*Attorney*—C. Cornell Remsen et al.

[57] ABSTRACT

A semiconductor injection laser device is provided with a narrow junction structure between layers of GaAs and GaAlAs which confines current flow and optical energy to minimize losses. Particular doping and layer growing techniques provide a central strip or ridge in the p-n junction extending between the end faces of the two layers. In one variation the junction crosses an intermediate GaAs layer between two outer GaAlAs layers.

1 Claim, 13 Drawing Figures

Inventor
GEORGE H. B. THOMPSON

By Edward Goldberg
Attorney

Inventor
GEORGE H. B. THOMPSON
By Edward Goldberg
Attorney

Inventor
GEORGE H. B. THOMPSON
By Edward Goldberg
Attorney

GALLIUM ARSENIDE LASERS

BACKGROUND OF THE INVENTION

1. Field of the Invention

This invention relates to GaAs - GaAlAs heterostructure injection lasers.

2. Description of the Prior Art

In order to obtain the highest temperature continuous wave operation from an injection laser it is necessary to use a geometry of construction which gives the best thermal path for the extraction of heat from the junction, and which at the same time confines the optical energy and the injected current to a specified region where optical losses and wasted recombination can be minimized. It has been found that the best ratio of heat extraction to heat generation, with minimum consequent temperature rise exists when lasing action is confined to a narrow filament. Typically such a filament should be less than 5 microns wide when a copper heat sink is used. This invention is concerned with a method of achieving the necessary filamentary confinement of current flow together with a measure of optical confinement. Previously confinement of current flow has been achieved either by adopting a stripe geometry in which the current is passed through a narrow metal contact on the surface of the semiconductor and arranging for the p-n junction to be so close beneath this contact that little spreading of the current occurs in the invervening region, or alternatively by locating the p-n junction in a physically narrow portion of the structure. The former method suffers from the disadvantage that only the current is confined, and, because there is no particular guiding of the optical mode, the optical energy spreads into a region typically 10 – 30 microns wide to give the normal, but not clearly understood, self-focussed filament. A disadvantage of the alternative method is that the optical guiding produced by the discontinuity at the side walls is so powerful that many different modes may be sustained including low threshold trapped modes which will dissipate energy without providing any useful output. There are two theoretical methods of overcoming this problem of unwanted modes. In one method the surface finish of the side walls is carefully controlled so that on the one hand it is not so smooth as to give rise to any significant specular reflection, and on the other hand it is not so rough as to distort significantly the wavefronts of any wanted modes. In the other method of side walls, which may be left optically flat, are embedded in a material having a refractive index not more than 5 percent smaller than that of GaAs. Under these circumstances the critical angle at the side is at least 72°, in which case the sum of the critical angle at the side wall and the critical angle at the end wall is equal to or greater than 90°, and hence no ring modes can be supported by total internal reflection. However neither of these methods of current confinement are particularly easy or economical to implement in practice.

SUMMARY OF THE INVENTION

According to the invention there is provided a GaAs - GaAlAs heterostructure injection laser including a narrow strip extending in the direction of the optical axis of the laser cavity from one end face thereof to the other in which the p-n junction is bounded on at least one side by GaAs, which strip is flanked by regions in which the p-n junction is bounded on both sides by GaAlAs.

This invention discloses an alternative method of current confinement in which reliance is placed on the fact that when a p-n junction intersects a heterojunction the ratio of the current densities of the main components of injected current in the regions where the p-n junction is respectively in the higher and the lower band-gap materials is approximately exp $(-\delta V/\phi)$, where $\delta V$ is the difference in energy between the band-gaps of the two materials defining the heterojunction, and where $\phi = kT$. The difference in band-gap energies between GaAs and GaAlAs containing 25 mole percent AlAs is approximately 0.2 eV, whereas at room temperatures $kT$ is approximately 0.025 eV. Therefore in a configuration in which a p-n junction intersects a heterojunction between these two materials the current flow across the p-n junction is virturally exclusively confined to the region where it resides in the lower band-gap material. If however the p-n junction does not actually penetrate into the GaAs but is merely contiguous with the heterojunction it can be shown that the ratio of the current densities will be approximately halved. Nevertheless the current density in the region of contact will still be very much greater than that in the regions where the pn junction is bounded on both sides by GaAlAs.

Therefore although it is preferable for the p-n junction to have a region in which it is bounded on both sides by GaAs, it is sufficient if there is at least a region where the p-n junction is bounded on one side by GaAs. In constructions in which the p-n junction penetrates into GaAs it is preferable to arrange for this penetration to be not more than about 1 to 2 microns in which case the structure will possess, in the direction normal to the junction, the favorable carrier and optical confinement properties of the conventional heterostructure. For a typical device the region in which the p-n junction lies in the lower band-gap material is approximately 5 microns wide.

There follows a description of illustrative embodiments of the invention with reference to the accompanying drawings.

DESCRIPTION OF THE PREFERRED EMBODIMENTS

Figures 1, 2A, 2B, 3A, 3B, 3C, 3D, 3E:
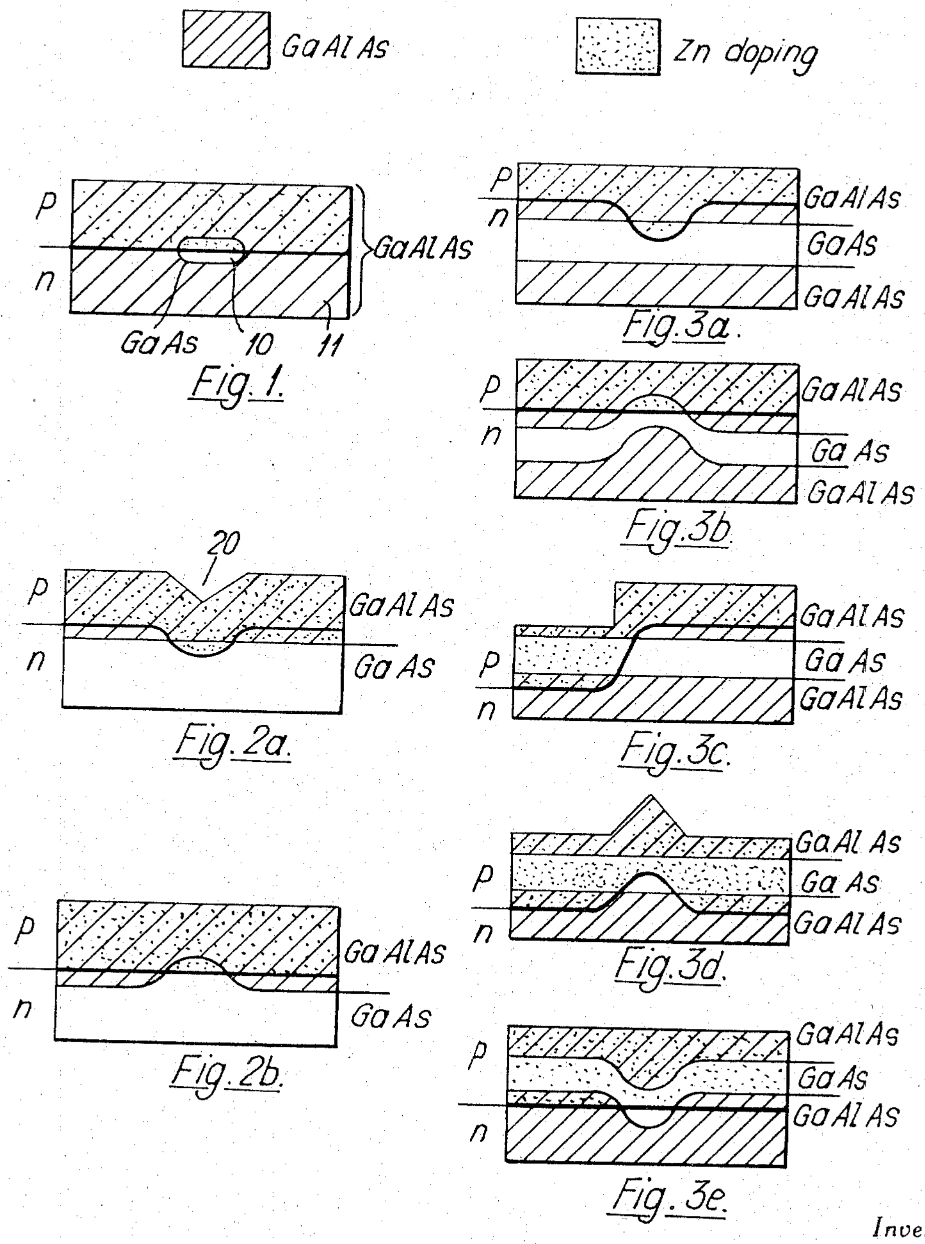
FIG. 1 depicts a section through a laser device having a filament of GaAs embedded in GaAlAs.
FIGS. 2*a* and 2*b* depict sections through two alternative single heterostructure laser devices.
FIGS. 3*a*, 3*b*, 3*c*, 3*d* and 3*e* depict sections through five alternative double heterostructure laser devices.

All the devices now to be described, with the exception of one method of making the device of FIG. 1, are grown from solution in n-type form and subsequently the regions which are required to be p-type have their conductivity type changed to p-type by diffusion of zinc. The GaAlAs contains approximately 25 atomic percent substitution of aluminum.

FIG. 1 shows a construction in which a filament 10 of GaAs is embedded in a supporting matrix 11 of GaAlAs. The diffusion of zinc to provide the necessary p-n junction is carefully controlled so that the p-n junction shall intersect the filament.

This construction affords very good optical confinement as well as current confinement because the filament is bounded on all sides by a material of higher refractive index. One method employed to fabricate this structure is by growing a piece of GaAlAs, etching a channel, growing sufficient GaAs to fill the channel so formed, polishing the surface so as to remove all the deposited GaAs not in the channel, growing a further layer of GaAlAs and finally diffusing zinc in to the appropriate depth.

A simpler alternative method of construction is similar to the above described method in all respects except that the final growing of the further layer of GaAlAs is performed in the presence of zinc so that this material is deposited in p-type form. Under these circumstances some of the zinc diffuses during the epitaxy in the underlying material, and in this way the final position of the p-n junction is arranged to lie where it will intersect the filament of GaAs. No separate stage of zinc diffusion is then required.

FIGS. 2*a* and 2*b* show alternative single heterostructure lasers. In the structure depicted in FIG. 2*a* the heterojunction is substantially plane while the p-n junction is provided with an inverted ridge by making a notch 20 in the upper surface before performing the zinc diffusion. In the structure depicted in FIG. 2*b* the GaAs is figured to provide a central ridge before the GaAlAs is grown on top of it. The upper surface of this GaAlAs will then also have a central ridge but this is removed by polishing before the diffusion of zinc so that when the zinc is later diffused it will provide a substantially plane p-n junction.

FIGS. 3*a*, 3*b*, 3*c*, 3*d* and 3*e* show alternative double heterostructure lasers. In the structure of FIG. 3*a* the inverted ridge in the p-n junction is formed in the same way as that in the structure of FIG. 2*a* with the notched surface being removed. Similarly in the structure of FIG. 3*b* the ridge in each of the two heterojunctions is formed in the same way as that in the structure of FIG. 2*b*, while the substantially plane p-n junction is similarly provided by removing the ridge from the upper surface of the device before performing the zinc diffusion.

In the structure of FIG. 3*c* the p-n junction is arranged to intersect both heterojunctions by forming a step in the upper surface before performing the zinc diffusion. This structure is thus contrasted with all the other structures of FIGS. 2 and 3 where the same heterojunction is intersected twice by the p-n junction. In all these other structures the zinc diffusion is very critical in order to ensure that the active part of the p-n junction shall be suitably close to the or each heterojunction to provide the appropriate current confinement. In the structure of FIG. 3*a* however the diffusion is less critical and it is easy to see that the effect of making the diffusion marginally more shallow or more deep merely serves to shift to the left or to the right respectively the location of p-n junction in the GaAs.

The structures of FIGS. 3*d* and 3*e* are analogous to those of FIGS. 3*a* and 3*b* with the difference that the heterojunction that is not intersected by the p-n junction resides entirely in p-type material in the structures of FIGS. 3*d* and 3*e* whereas it resides entirely in n-type material in the structure of FIGS. 3*a* and 3*b*.

Figure 4:
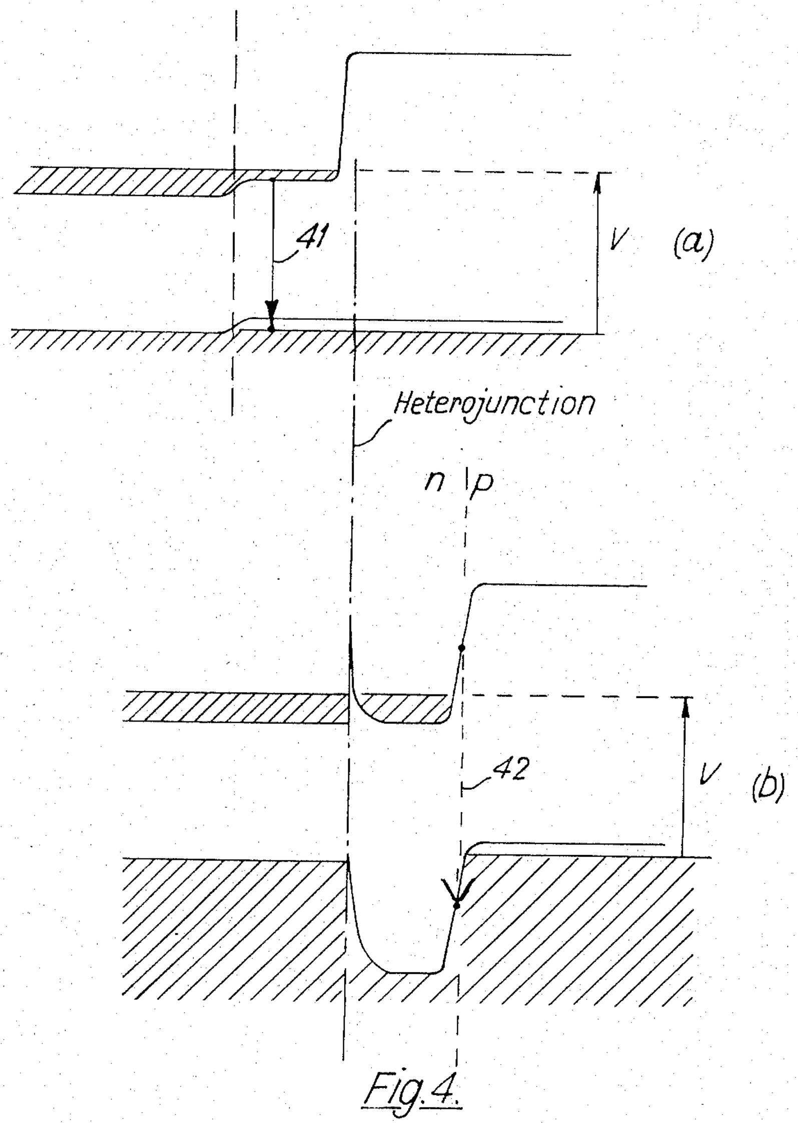
FIGS. 4*a* and 4*b* show the potential and carrier distribution where the p-n junction is located respectively in the lower and in the higher energy band-gap materials of a single heterostructure laser device.
Figure 5:
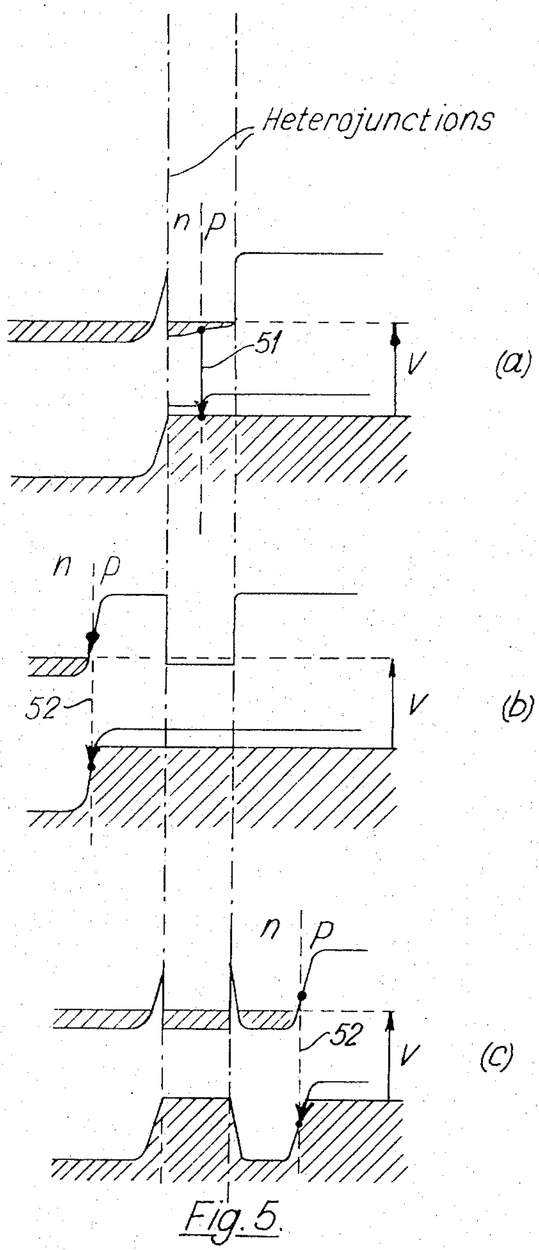
FIGS. 5*a*, 5*b* and 5*c* show the potential and carrier distribution where the p-n junction is located respectively in the lower energy band-gap material, and in the higher energy band-gap material on either side of the lower energy band-gap material.

The potential and carrier distribution for different relative positions of the p-n junctions and the heterojunctions of the structures of FIGS. 2 and 3 are illustrated in FIGS. 4 and 5. These show how the current in these various structures is effectively limited to those parts of the p-n junctions which lie in the narrower band-gap material. The behaviour for the single heterostructure lasers of FIG. 2 is illustrated in FIGS. 4*a* and 4*b*. The location of the heterojunctions in these Figures is represented by chain dotted lines. FIG. 4*a* shows the distribution which results in the region where the p-n junction lies in the lower band-gap material when a potential V is applied which is just sufficient to cause overlap of the electron and hole populations on the p side of the junction thereby producing in that region a high recombination current (represented by the full arrow 41). FIG. 4*b* shows the distribution which results in those parts where the p-n junction lies in the higher band-gap material under the same conditions of potential bias V. From this latter Figure it can be seen that there will be negligible recombination current (represented by the dashed arrow 42). The behaviour for the double heterostructure lasers of FIG. 3 is illustrated in FIGS. 5*a*, 5*b* and 5*c*. These show the distributions resulting when the p-n junction is respectively located in the lower band-gap material, in the higher band-gap material leaving the GaAs in the p-type region, and in the higher band-gap material leaving the GaAs in the n-type region. In FIG. 5*a* where the p-n junction lies in the lower band-gap material, the applied voltage V is sufficient to cause overlap of the electron and hole population regions on both sides of the p-n junction thereby producing a high recombination current (represented by the full arrow 51), whereas under the conditions represented in FIGS. 5*b* and 5*c* the same applied voltage V is insufficient to cause any appreciable overlap of carriers and hence the injected current (represented by the dashed arrows 52) is in both cases negligible.

In the structures of FIGS. 2*a* and 2*b* the p-type GaAs is bounded partly by a p-n junction, while the remainder is bounded by the higher band-gap GaAlAs, and hence the electrons injected into this region are completely confined. On the other hand the n-type GaAs is not similarly bounded, and hence for injected holes there is no confinement in the direction normal to the p-n junction. This absence of hole confinement is remedied in the double heterostructure lasers of FIGS. 3*a* and 3*b* where the n-type GaAs is also backed by a heterojunction. Thus the devices of FIGS. 3*a* and 3*b* provide complete electron confinement and hole confinement in the direction normal to the heterojunction. The hole confinement is not quite complete insofar as holes can diffuse transversely. The electron and hole confinement in double heterostructure lasers of FIGS. 3*d* and 3*e* is analoguous with that in the structures of FIGS. 3*a* and 3*b* except for the difference that the roles of the electrons and holes are reversed. Thus there is complete hole confinement but incomplete electron confinement. In the double heterostructure of FIG. 3*c* both injected holes and injected electrons are confined in all except one transverse direction (toward the left of the drawing for electrons and toward the right of the drawing for holes).

The refractive index of the lower band-gap material, GaAs, is considerably greater than that of the higher band-gap material. Also p-type GaAs has a slightly higher refractive index than n-type GaAs. Since the optical energy tends to be confined to the material of the higher refractive index all these structures of laser provide a measure of optical confinement to the p-side of a p-n junction and a considerably greater amount of confinement to the lower band-gap side of a heterojunction. In the structure depicted in FIG. 1 the optical confinement is very good because the filament is entirely surrounded by a heterojunction. In each of the structures depicted in FIGS. 2*a*, 2*b*, 3*a* and 3*b* there is a central p-type region of GaAs which is bounded in part by a heterojunction while the remainder is bounded by a p-n junction. This central p-type region can therefore support an optical mode which is tightly bound on the heterojunction side and less tightly bound on the p-n junction side. In the case of the double heterostructures of FIGS. 3*a* and 3*b* the confinement on the p-n junction side of the p-type region is reinforced by the presence of the underlying second heterojunction. The double heterostructure depicted in FIG. 3*c* gives rather less effective optical confinement since there is no barrier to prevent light spreading through the p-type GaAs in one transverse direction (toward the left of the drawing). The double heterostructures depicted in FIGS. 3*d* and 3*e* give even less effective optical confinement because there is no barrier to prevent light spreading through the p-type GaAs in both transverse directions.

It is to be understood that the foregoing description of specific examples of this invention is made by way of example only and is not to be considered as a limitation on its scope.

What is claimed is:

1. A GaAs - GaAlAs heterostructure injection laser comprising a center layer of GaAs positioned between two outer layers of GaAlAs forming two heterojunctions at respective opposite sides of said GaAs layer, said center and outer layers including first and second juxtaposed layers respectively of p and n opposite conductivity type semiconductor materials having opposite end faces and side walls forming a laser cavity, each of said center and outer layers having portions of p and n materials, said GaAs layer including a narrow strip extending longitudinally in the direction of the optical axis of the laser cavity between said opposite end faces, said first and second layers forming a p-n junction extending in said direction and having a portion bounded on both sides by said GaAs strip and including opposite lateral areas along said strip bounded on both sides by GaAlAs, said p-n junction crossing from one layer of GaAlAs through one heterojunction and through said GaAs layer and second heterojunction to the other said layer of GaAlAs, the crossing points being at two laterally spaced positions defining the lateral extent of said strip, said GaAlAs region material having a higher band gap and lower index of refraction than said GaAs region material, and said p type GaAs material having a higher index of refraction than said n type of GaAs material.

* * * * *

UNITED STATES PATENT OFFICE
CERTIFICATE OF CORRECTION

Patent No. 3,780,358 Dated December 18, 1973

Inventor(s) George H. B. Thompson

It is certified that error appears in the above-identified patent and that said Letters Patent are hereby corrected as shown below:

On the Title Page, insert

[32] Priority October 13, 1970

[33] Great Britain

[31] 48610/70

Signed and sealed this 23rd day of April 1974.

(SEAL)
Attest:

EDWARD M.FLETCHER,JR.
Attesting Officer

C. MARSHALL DANN
Commissioner of Patents